United States Patent
Yang

(10) Patent No.: US 8,094,027 B2
(45) Date of Patent: Jan. 10, 2012

(54) METHOD FOR MOLDING AN OBJECT CONTAINING A RADIO FREQUENCY IDENTIFICATION TAG

(75) Inventor: Tahua Yang, Woodridge, IL (US)

(73) Assignee: Abbott Laboratories, Abbott Park, IL (US)

( * ) Notice: Subject to any disclaimer, the term of this patent is extended or adjusted under 35 U.S.C. 154(b) by 1055 days.

(21) Appl. No.: 11/960,149

(22) Filed: Dec. 19, 2007

(65) Prior Publication Data

US 2011/0297306 A1   Dec. 8, 2011

(51) Int. Cl.
   *G08B 13/14*  (2006.01)
(52) U.S. Cl. ............... 340/572.8; 340/572.1; 235/492; 235/375
(58) Field of Classification Search .............. 340/572.8, 340/572.1, 572.4, 568.1, 571; 343/700 MS; 428/40.1; 235/492, 375, 439, 449, 472.02, 235/487; 156/60, 249, 265, 267, 277, 250
   See application file for complete search history.

(56) References Cited

U.S. PATENT DOCUMENTS

| | | | |
|---|---|---|---|
| 3,292,209 A | 12/1966 | Borkmann | |
| 4,643,789 A | 2/1987 | Parker et al. | |
| 4,650,533 A | 3/1987 | Parker et al. | |
| 6,074,615 A | 6/2000 | Lewis et al. | |
| 6,117,384 A | 9/2000 | Laurin et al. | |
| 6,294,998 B1 | 9/2001 | Adams et al. | |
| 6,429,831 B2 * | 8/2002 | Babb | 343/895 |
| 6,548,006 B1 | 4/2003 | Herbst | |
| 6,555,062 B1 | 4/2003 | Lewis et al. | |
| 6,957,777 B1 | 10/2005 | Huang | |
| 7,176,796 B2 | 2/2007 | Chen et al. | |
| 7,971,795 B2 * | 7/2011 | Huang | 235/492 |
| 2006/0174470 A1 | 8/2006 | Sadek | |
| 2006/0176180 A1 | 8/2006 | Freund | |
| 2006/0188595 A1 | 8/2006 | Furukawa et al. | |
| 2007/0098942 A1 | 5/2007 | Cote et al. | |

OTHER PUBLICATIONS

PCT International Search Report, Apr. 27, 2009.
UV Light Curing Adhesives for Glass, Metal and Plastic Assembly. Brochure LIT220 [online]. DYMAX Corporation, Mar. 19, 2007 [Retrieved on Dec. 13, 2007] Retrieved from the internet: <URL: http://www.dymax.com/pdf/literature/lit220_glass_plastic_metal_sg.pdf>, pp. 1-11.
MD Adhesives for Medical Device Assembly. Brochure LIT012B [online]. DYMAX Corporation, Mar. 8, 2007 [Retrieved on Dec. 13, 2007] Retrieved from the internet: <URL: http://www.dymax.com/products/glass/index.php#>, pp. 1-8.
Encyclopedia of Polymer Science and Engineering, vol. 2, John Wiley & Sons, Inc. (1985), pp. 447-478.

(Continued)

*Primary Examiner* — Toan N Pham
(74) *Attorney, Agent, or Firm* — Timothy P. Lucier

(57) ABSTRACT

A method for applying a radio frequency identification tag to an object, e.g., a container, by means of an insert molding process or in-mold decorating process. Such a method can be utilized to simplify the manufacturing processes for applying a radio frequency identification tag to an object, e.g., a container. The molding process can be a conventional molding process, such as, for example, injection molding, blow molding, compression molding, transfer molding, and rotational molding. However, the conventional molding process is modified by inserting a radio frequency identification tag into the cavity of the mold prior to forming the molded article. The modified molding process results in a molded article having a radio frequency identification tag encapsulated by the polymeric material of the molded article.

12 Claims, 11 Drawing Sheets

OTHER PUBLICATIONS

Encyclopedia of Polymer Science and Engineering, vol. 4, John Wiley & Sons, Inc. (1996), pp. 79-108.
Encyclopedia of Polymer Science and Engineering, vol. 8, John Wiley & Sons, Inc. (1987), pp. 102-138.
Encyclopedia of Polymer Science and Engineering, vol. 14, John Wiley & Sons, Inc. (1988), pp. 72-100.
Encyclopedia of Polymer Science and Engineering, vol. 16, John Wiley & Sons, Inc. (1989), pp. 807-832.
Injection Molding Machine. Encyclopedia [online]. Plastics Wiki [retrieved on Dec. 13, 2007] Retrieved from the internet: <URL:http://Plastics.inwiki.org/injection_molding_machine>, pp. 1-4.
Radiation Curing: Science and Technology, edited by S. Peter Pappas, Plenum Press (New York: 1992), pp. 333-398.
About Roll Coaters. Brochure [online]. Schaefer Machine Company Inc. [Retrieved on Dec. 13, 2007] Retrieved from the internet: <URL: http://www.schaeferco.com/about_rollcoaters.html>, pp. 1-14.

* cited by examiner

METHOD FOR MOLDING AN OBJECT CONTAINING A RADIO FREQUENCY IDENTIFICATION TAG

BACKGROUND OF THE INVENTION

1. Field of the Invention

This invention relates to a method for attaching a radio frequency identification tag to an article, more particularly, a container suitable for use in a diagnostic instrument.

2. Discussion of the Art

Currently, in the area of medical diagnostics, identification of containers is generally effected by bar code labels. Bar code labels require printing onto or application onto the surface of the container. Bar code labels require an unobstructed optical path to be read, which generates design challenges for both the container and the bar code readers. The bar code label is required to be clear, i.e., the print quality must be satisfactory and the label must be clear of foreign material, such as frost resulting from humidity and storage at low temperatures. Bar code labels generally have only a limited quantity of space, with the result that the information that can be written on a bar code label is extremely limited. Bar code labels can be removed and reused, thereby leading to counterfeiting issues. Bar code labels can delaminate from the containers on account of condensation of water or low temperatures.

In the area of medical diagnostics, identification of containers by means of radio frequency identification tags and data capturing systems utilizing radio frequency identification tags can be used in order to comply with Food and Drug Administration (FDA) regulations for management of supply chains.

Radio frequency identification tags can be categorized as active, semi-passive, and passive radio frequency identification tags. The main difference between the three types of radio frequency identification tags resides in the nature of the power supply. The passive radio frequency identification tag does not require any installed power source. The passive radio frequency identification tags contain a microchip and an antenna. The minute electrical current induced in the antenna by an incoming radio frequency signal provides sufficient power to cause the microchip to transmit a response. FIG. 1 illustrates a typical radio frequency identification tag that has a microchip and an antenna.

The most critical obstacle for utilizing radio frequency identification tags is high cost. The cost of microchips associated with radio frequency identification tags is high relative to the cost of typical diagnostic products. Microchips will be expensive, unless they can be mass-produced. In addition, counterfeiting is possible by removing the radio frequency identification tag and reattaching a different radio frequency identification tag. Appearance of the container is also problematic, because attachment of radio frequency identification tags to containers results in a bumpy surface and a rough appearing surface. Still another problem is delamination of the radio frequency identification tag from the container. Finally, the scrap rate of radio frequency identification tag assembly is high on account of the difficulty inherent in the placement of a chip on the antenna contacts.

U.S. Pat. No. 6,294,998 discloses a radio frequency identification tag with a uniform profile. A compressible mask layer or cutout mask layer provides a uniform profile despite the presence of the radio frequency identification integrated circuit and antenna. The uniform profile allows clear overprinting and hinders visual detection of the radio frequency identification transponder. This radio frequency identification tag is highly susceptible to delamination from a container. U.S. Pat. No. 6,429,831 discloses a laminated label having a first conductive material defining electrical attachment pads; a dielectric material surrounding the attachment pads; a second conductive material deposited on the dielectric material and forming an antenna electrically connected to the attachment pads. A layer of expandable material forms a protective cavity surrounding the attachment pads. An IC chip is received in the protective cavity and connected to the antenna. This radio frequency identification tag is highly susceptible to delamination from a container. U.S. Pat. No. 6,548,006 discloses a plastic material injection molding machine comprising a mold having at least two mold portions and a handling system adapted to be inserted between the mold portions when the mold is in the open position, for transferring an article between the handling system and a predetermined mold portion. The device has many moving parts that are subject to wear and require a great deal of fine-tuning. U.S. Pat. No. 6,957,777 discloses a label to be attached on a plastic product formed in a mold and identifiable by a detecting device including a soft circuit board, a protective layer, and an adhesive layer. The soft circuit board has its outer layer provided with a radio frequency identification device (RFID). The protective layer is transparent, adhered on the outer surface of the soft circuit board for protecting and enabling RFID identified by a signal transmitted by a wireless detecting device. The adhering layer is made of a compound material and adhered on an inner layer for protecting the inner surface of the soft circuit board and the RFID as well. The label is attached on a plastic product during injecting molding process, widely usable for identifying an object affixed with the label by means of a detecting device. It is expected that the cost of preparing a three-layer subassembly along with the cost of a robotic handling system to place the subassembly into a mold would be high. U.S. Pat. No. 7,176,796 discloses a sealing cap with an anti-counterfeit and identification capability comprising a cap body, and identification chip with a signal emitting device generating an identification signal, and a destructive device, characterized in that the cap body is electrically connected with the signal generating device and serves as an antenna of a relatively large area and in that the destructive device after dismounting of the cap destroys the capability to emit radiation and thus prevents the identifying chip from being dismounted and reused. The radio frequency identification tag is required to be on the cap of the container. U.S. Patent Application Publication 2006/0174470 discloses a transfer resisitant RFID tag including an identification chip, a tag coil, a housing and a cap. The identification chip is electrically connected to the tag coil with two wires. A first quantity of bonding compound is applied to a surface that is slightly greater than a surface area of the identification chip. A second quantity of bonding compound is applied to the surface that is slightly greater than the end surface area of the housing. One end of the housing is attached to the second quantity of bonding compound. Then the identification chip is attached to the first quantity of bonding compound. The cap is snapped over the tag coil and the other end of the housing. If someone tries to transfer the RFID tag from one surface to another, the two wires or the identification chip will be destroyed during removal. If tampering occurs, the wires connected to the radio frequency identification tag will be destroyed, and the device will be rendered useless. U.S. Patent No. 2007/0098942 discloses a poly sheet continuously moving in a machine direction is heated to a temperature just below its glass thermal temperature to make the poly malleable. A circuit (e.g., RFID chip, EAS chip, transponder, IC) is placed on the poly sheet and embedded into the poly sheet, preferably with a heat resistant soft (e.g., rubber) roller that presses the circuit into the poly without breaking the circuit. A conductive strip or wire may be applied on or into the poly sheet to align with connection points (e.g., conductive bumps) of the circuit for conductive communication with the circuit.

In-mold decoration is known in the prior art. See, for example, U.S. Pat. Nos. 4,643,789; 4,650,533; 2006/0188595; 3,292,209; 6,117,384.

It would be desirable to develop a method for applying a radio frequency identification tag to an article, e.g., a container, in such a manner as to reduce costs, to reduce the risk of counterfeiting of the radio frequency identification tag, and to improve the appearance of the radio frequency identification tag.

SUMMARY OF THE INVENTION

This invention provides a method for applying a radio frequency identification tag to an article, e.g., a container, by means of an insert molding process or in-mold decorating process. Such a method can be utilized to simplify the manufacturing processes for applying a radio frequency identification tag to an object, e.g., a container.

The molding process can be a conventional molding process, such as, for example, injection molding, blow molding, compression molding, transfer molding, and rotational molding. However, the conventional molding process is modified by inserting a radio frequency identification tag into the cavity of the mold prior to forming the molded article. The modified molding process results in a molded article having a radio frequency identification tag encapsulated by the polymeric material of the molded article.

In one aspect, the process comprises the steps of:
(a) providing a roll of adhesive coated composite film, the adhesive coated composite film comprising a polymeric backing, a layer of release liner, and a layer of radiation-curable adhesive between the polymeric backing and the layer of release liner, one major surface of the layer of radiation-curable adhesive being in face-to-face contact with one major surface of the polymeric backing and the other major surface of the layer of radiation-curable adhesive being in face-to-face contact with one major surface of the layer of release liner;
(b) forming a part from the adhesive coated composite film for bearing a radio frequency identification tag, the part formed by means of thermoforming;
(c) removing the layer of release liner from the thermoformed part;
(d) providing a roll comprising a plurality of radio frequency identification tags, one major surface of each radio frequency identification tag being in face-to-face contact with one major surface of a layer of protective film;
(e) at least partially embedding the radio frequency identification tags in the layer of radiation-curable adhesive of the thermoformed part;
(f) fixing the radio frequency identification tag by means of a radiation curing process to form an assembly comprising a polymeric backing, radio frequency identification tags, and a layer of protective film;
(g) cutting the assembly in step (f) by means of a cutting apparatus to form an assembly comprising a polymeric backing, a single radio frequency identification tag, and a layer of protective film;
(h) molding an article, e.g., a container in a mold, and attaching the radio frequency identification tag to the molded article, e.g., the container, in the mold; and
(i) releasing the molded article, e.g., the container, to which the radio frequency identification tag is attached from the mold.

The aforementioned process utilizes the steps of thermoforming a part for bearing a radio frequency identification tag, applying a radio frequency identification tag by at least partially embedding the radio frequency identification tag in a radiation-curable adhesive applied to the thermoformed part, fixing the radio frequency identification tag by means of a radiation curing step, cutting the radio frequency identification tag from the web by means of a cutting apparatus, and applying the radio frequency identification tag to an article, e.g., a container, by means of an insert molding step.

The benefits of applying a radio frequency identification tag to an article, e.g., a container, by the method of this invention, i.e., a web process incorporating an insert molding step, include, but are not limited to, reduction of cost, reduction of the risk of counterfeiting of the radio frequency identification tag, and improvement in appearance of the radio frequency identification tag. In particular, the likelihood of delamination of the radio frequency identification tag is reduced because the assembly comprising the microchip and the antenna is protected by the polymeric material used for preparing the article, e.g., the container, itself. A conventional radio frequency identification tag is subject to being damaged and is also subject to tampering. The method described herein makes it possible to consolidate the steps of forming an article, e.g., a container, by means of a molding process and applying a radio frequency identification tag to the article, e.g., the container, during the molding process, thereby eliminating the step of applying a radio frequency identification tag to the article, e.g., the container, after the article, e.g., the container, is formed, by molding or by other means.

DETAILED DESCRIPTION

Figure 1:
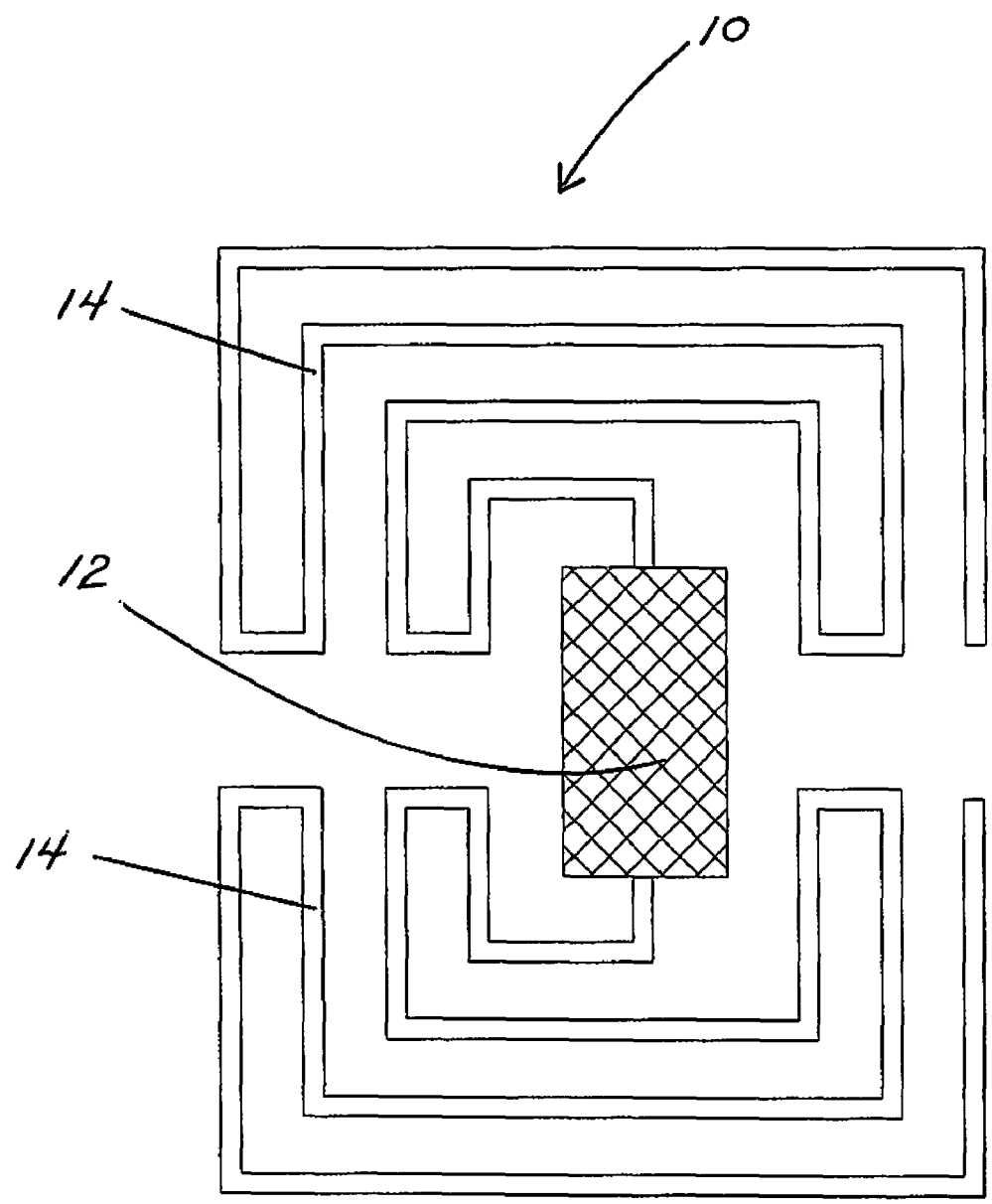
FIG. 1 is a top plan view, greatly enlarged, of a radio frequency identification tag.

As used herein, the expression "radio frequency identification", or RFID, is a generic term for technologies that use radio waves to automatically identify objects, such as, for example, containers for biological samples and containers for reagents for analyzing biological samples. The most common method of identification is to store a serial number that identifies the object, and perhaps other information relating to the object or contents thereof, on a microchip that is attached to an antenna. The microchip and the antenna together are called a radio frequency identification transponder or a radio frequency identification tag. The antenna enables the microchip to transmit the identification information and other information to a radio frequency identification reader. The radio frequency identification reader converts the radio waves reflected back from the radio frequency identification tag into digital information that can then be passed on to computers that can make use of it.

As used herein, the expression "radio frequency identification system" means a system comprising a radio frequency identification tag made up of a microchip with an antenna, and a radio frequency identification interrogator or radio frequency identification reader with an antenna. The radio frequency identification reader sends out electromagnetic waves. The tag antenna is tuned to receive these waves. A passive radio frequency identification tag draws power from the field created by the reader and uses it to power the circuits of the microchip. The microchip then modulates the waves that the passive radio frequency identification tag sends back to the radio frequency identification reader, which converts the waves received by the radio frequency identification reader into digital data.

As used herein, microchips in radio frequency identification tags can be "read-write microchips", "read-only microchips", or "write once, read many microchips." In the case of read-write microchips, information can be added to the radio frequency identification tag or existing information can be written over when the radio frequency identification tag is within range of a radio frequency identification reader. Read-write microchips usually have a serial number that cannot be written over. Additional blocks of data can be used to store additional information about the items to which the radio frequency identification tag is attached. These radio frequency identification tags can be locked to prevent overwriting of data or encrypted to prevent the disclosure of proprietary data or disclosure of data that would compromise the privacy of a patient. Read-only microchips have information stored on them during the manufacturing process. The information on them can never be changed. Write once, read many microchips have a serial number written to them once, and that information cannot be overwritten later.

As used herein, the expression "active radio frequency identification tags" have a transmitter and their own power source, typically a battery. The power source is used to run the microchip's circuitry and to broadcast a signal to a radio frequency identification reader. "Passive radio frequency identification tags" have no battery. Instead, passive radio frequency identification tags draw power from the radio frequency identification reader, which sends out electromagnetic waves that induce a current in the tag's antenna. "Semi-passive tags" use a battery to run the microchip's circuitry, but communicate by drawing power from the radio frequency identification reader. Any of the foregoing types of radio frequency identification tags can be used in the system of this invention.

As used herein, the term "thermoforming" means a manufacturing process for thermoplastic sheet or film. The sheet or film is heated between infrared, natural gas, or other heaters to its forming temperature. Then it is stretched over or into a temperature-controlled, single-surface mold. Cast or machined aluminum is the most common mold material, although epoxy, wood and structural foam tooling are sometimes used for low volume production. The sheet is held against the mold surface unit until cooled. The formed part is then trimmed from the sheet. The trimmed material is usually reground, mixed with virgin plastic, and reprocessed into usable sheet.

As used herein, the expression "vacuum forming" means a simplified version of thermoforming, whereby a sheet of plastic is heated to a forming temperature, stretched onto or into a single-surface mold, and held against the mold by applying vacuum between the mold surface and the sheet. Normally, draft angles must be present in the design of the mold, e.g., at least 3°; otherwise release of the formed plastic and the mold is very difficult. Materials that are suitable for use in vacuum forming are conventional thermoplastics, the most common and easiest being polypropylene, polyethylene terephthalate, and polystyrene.

As used herein, the expression "pressure forming" means a process that is similar to vacuum forming, except with the addition of pressure, which pushes the sheet into the shape of the mold. This process is mainly used for parts that require styling and aesthetic qualities because pressure forming creates greater detail, allowing for textured surfaces, undercuts and sharp corners, which are not as easily created with vacuum forming.

As used herein, the expression "drape forming" means a process wherein a sheet of plastic is heated and stretched down, generally over a male mold. Next, depending upon the shape of the mold, gravity alone will pull the material to the mold or commonly, a vacuum is applied to draw the sheet to the mold which will more detail to the inside of the part.

As used herein, the expression "insert molding" means a method of permanent mechanical bonding, which method involves the placing of a substrate in a mold and covering all or part of the inserted substrate with a second liquid or molten plastic. Care must be taken to ensure that the inserted substrate does not shift out of its intended position during the injection of high viscosity polymer melts. As used herein, the expressions "in-mold decorating", "in-mold labeling", and the like, refer to a process for labeling or decorating a plastic object while the object is being formed in a mold. In this process, a label or appliqué is placed in the open mold and held in the desired position by vacuum ports, electrostatic attraction, or other appropriate means. The mold closes and the molten plastic resin is extruded or injected, or introduced by another equivalent method, into the mold, where it conforms to the shape of the object. The hot plastic envelops the label, making it an integral part of the molded object.

As used herein, the term "reel" means a device, as a cylinder, spool, or frame, that spins on an axis and is used for winding rope, tape, or other flexible materials. As used herein, the term "roll" means something rolled up in the form of a cylinder, such as, for example, a roll of tape. As used herein, the term "roller" means a small spokeless wheel, such as, for example, as that of a roller skate. As used herein, the term "to embed" means to enclose in a matrix. As used herein, the term "to fix" means to put into a stable and unalterable form. As used herein, the expression "die cutting machine" means a machine having a part that punches shaped holes in, cuts, or forms sheet, metal, cardboard, or other stock. The expression "laser cutting machine" means a machine that uses a laser to cut materials. Laser cutting works by directing the output of a high power laser, by computer, at the material to be cut. The material then either melts, burns, vaporizes away, or is blown away by a jet of gas, leaving an edge with a high quality surface finish. As used herein, the term "film" means a thin, generally flexible sheet, as of plastic. As used herein, the expression "adhesive coated composite film" means a multiple layer article comprising a polymeric backing, a layer of release liner, and a layer of radiation-curable adhesive between the polymeric backing and the layer of release liner, one major surface of the layer of radiation-curable adhesive being in face-to-face contact with one major surface of the polymeric backing and the other major surface of the layer of radiation-curable adhesive being in face-to-face contact with one major surface of the layer of release liner. As used herein, the term "web" means a large continuous roll of polymeric material or paper, in the process of manufacture or as it is fed into various work stations.

Figure 2:
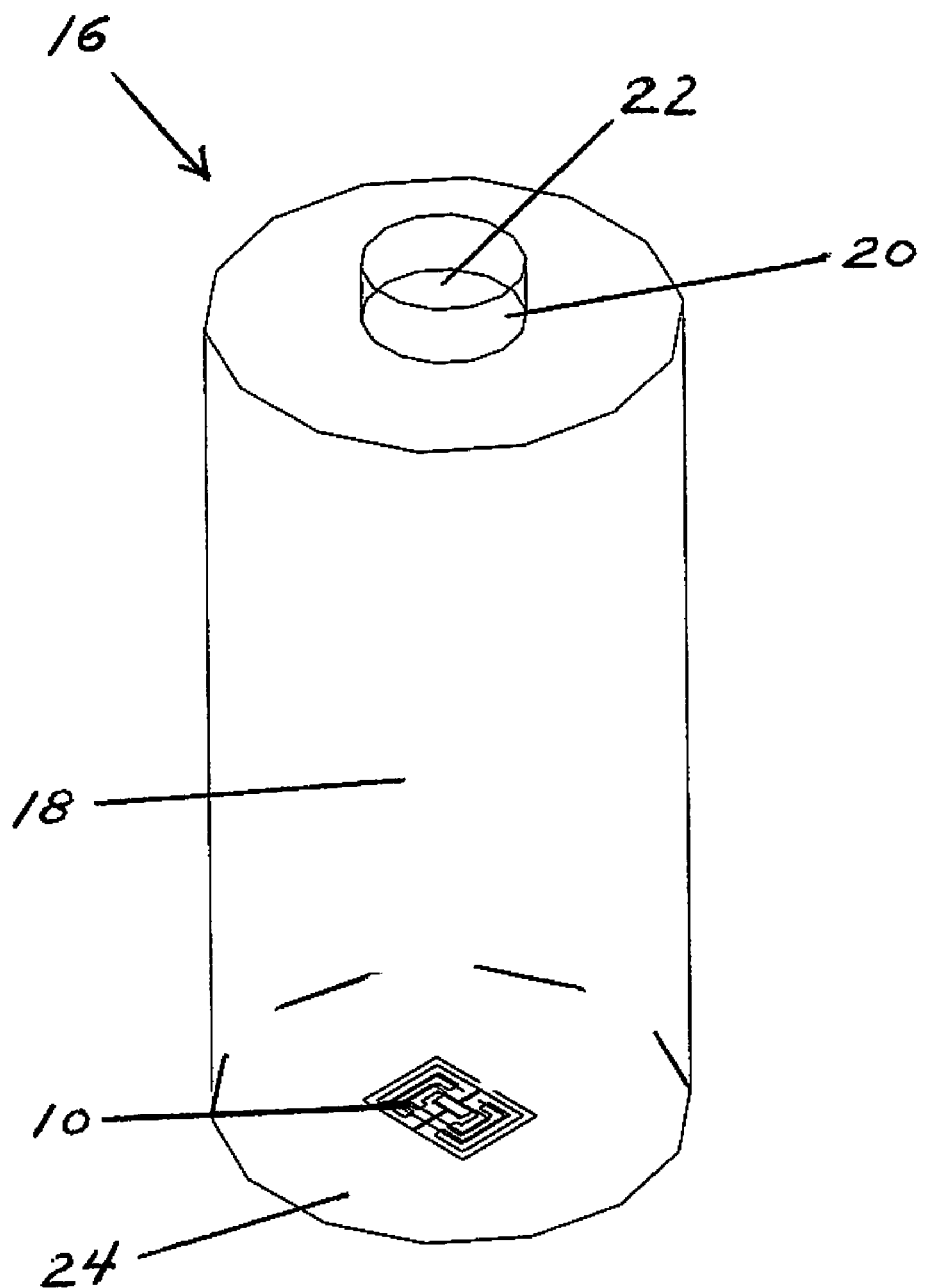
FIG. 2 is a perspective view of a container bearing a radio frequency identification tag.
Figure 3:
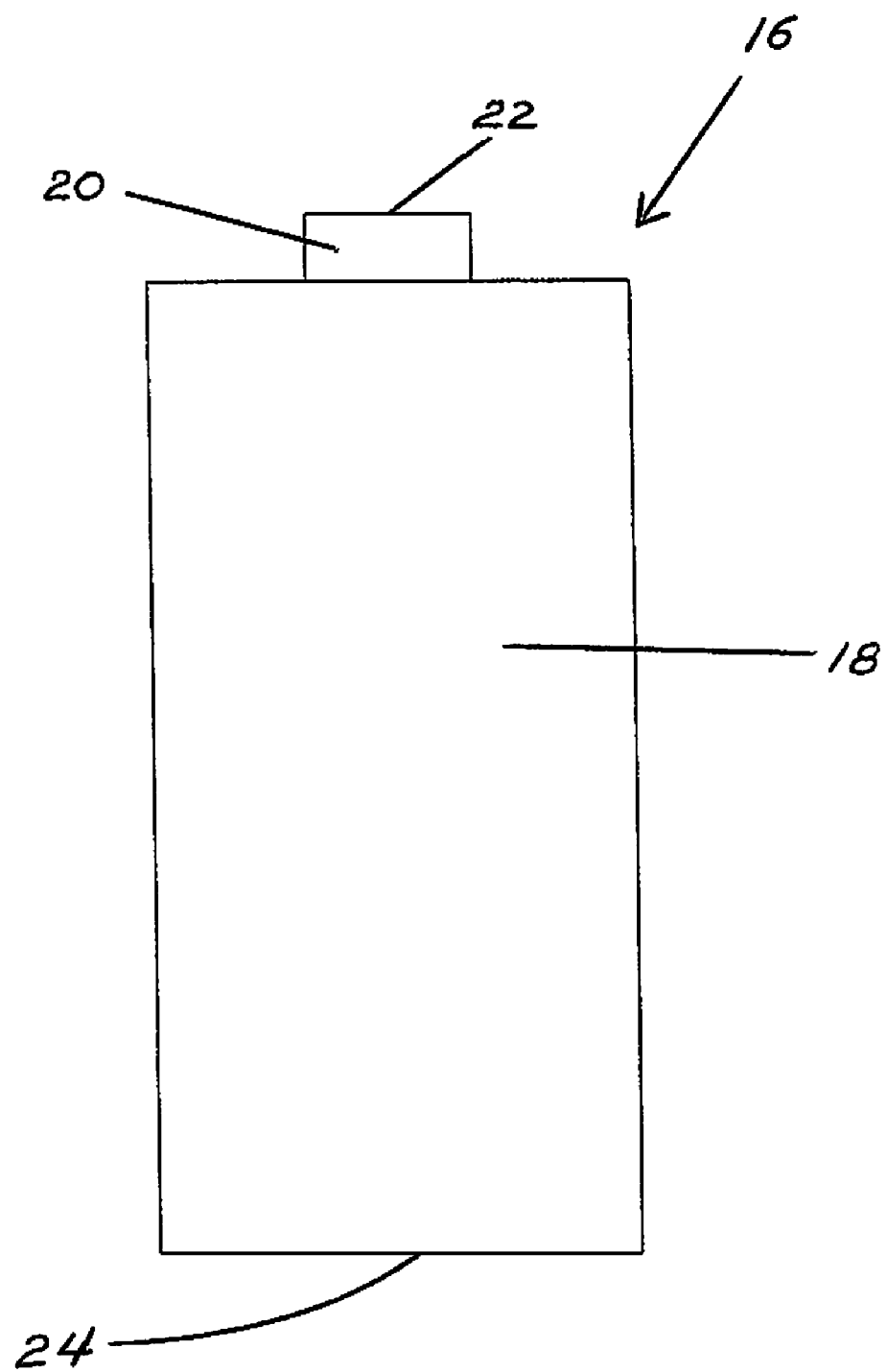
FIG. 3 is a side view in elevation of the container shown in FIG. 2.
Figure 4:
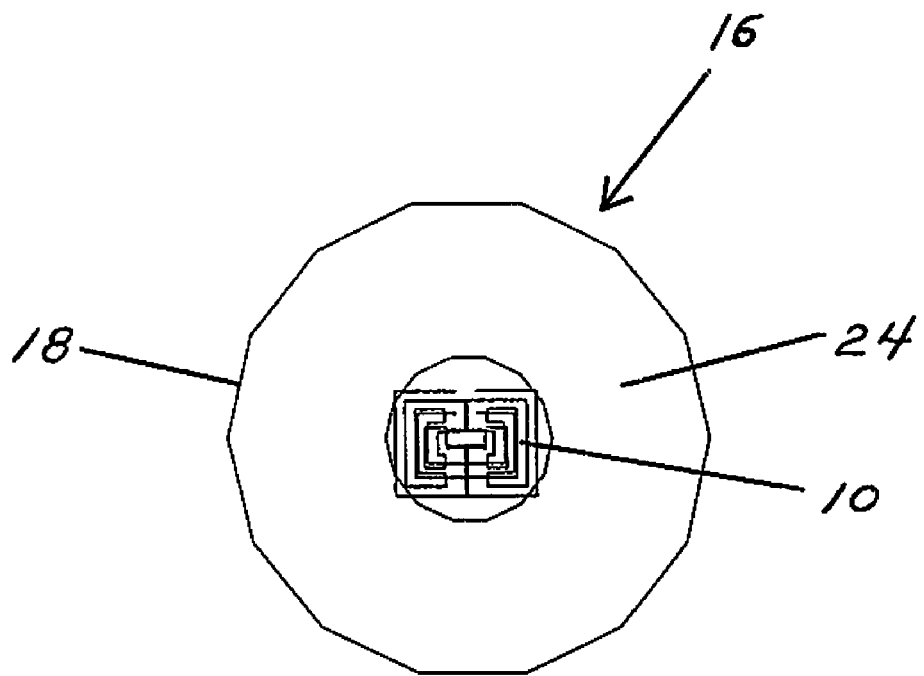
FIG. 4 is a bottom plan view of the container shown in FIG. 2.

FIG. 1 shows a radio frequency identification tag 10 having a microchip 12 and an antenna 14. FIGS. 2, 3, and 4 show various views of a container to which a radio frequency identification tag 10 can be attached. The container 16 comprises a body 18, a neck 20, and a mouth 22. The container 16 can also have a closure (not shown). As shown in FIG. 4, the radio frequency identification tag 10 is attached to the bottom 24 of the body 18 of the container 16. A container suitable for use herein is shown in U.S. Pat. Nos. 6,074,615 and 6,555,062, incorporated herein by reference.

Figure 5:
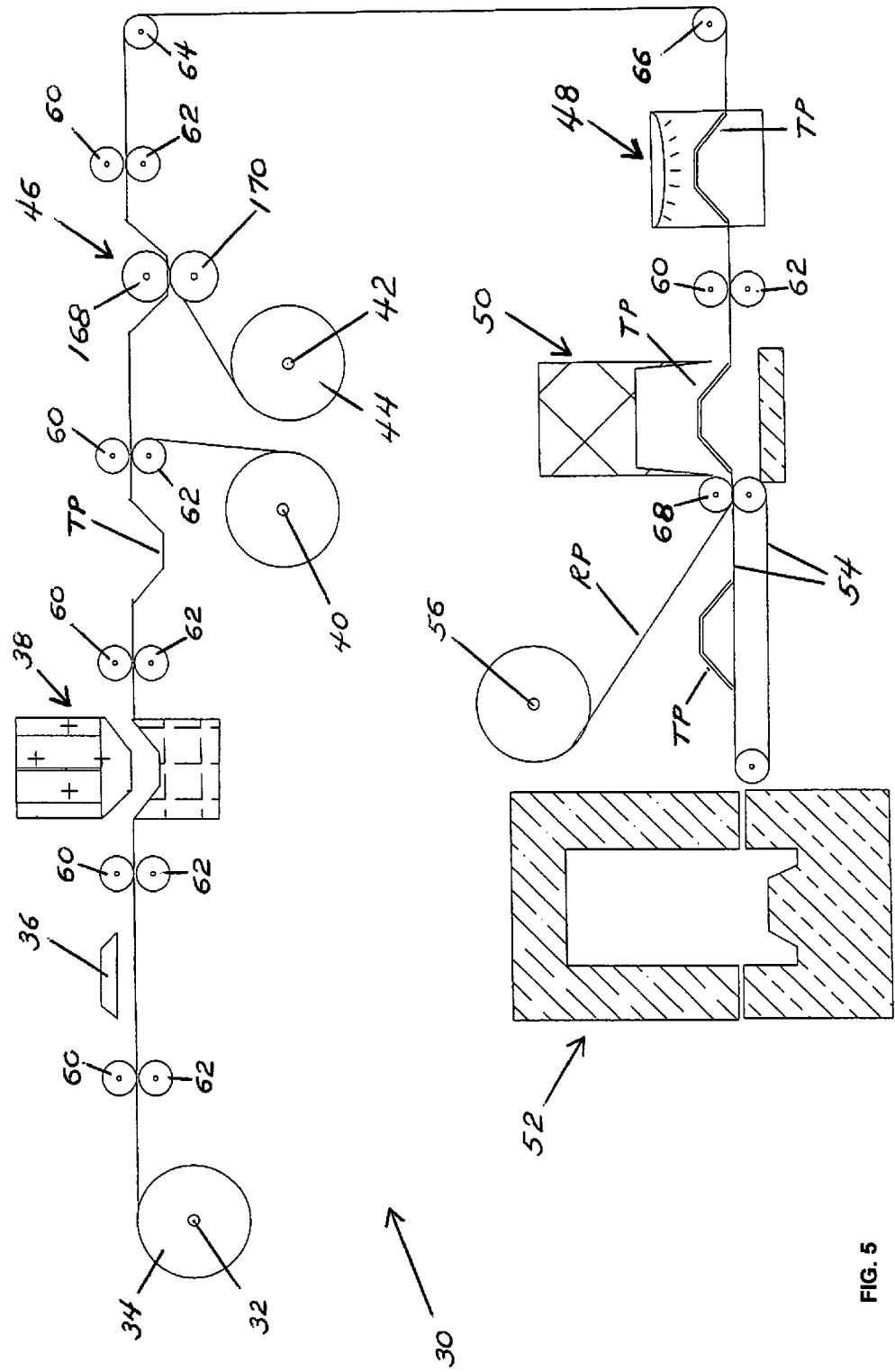
FIG. 5 is a schematic diagram illustrating an apparatus suitable for preparing the container bearing the radio frequency identification tag shown in FIGS. 2, 3, and 4.

Referring now to FIG. 5, an apparatus 30 comprises a reel 32 for holding a roll of an adhesive coated composite film 34, a heating station 36 for softening an adhesive coated composite film 34 prior to a thermoforming step, a thermoforming station 38 for forming a part "TP" that will conform to the shape of a component of a molding device, a take-up reel 40 for taking up a release liner, a reel 42 for holding a roll 44 of radio frequency identification tags, a station 46 for transferring radio frequency identification tags to the thermoformed part "TP", a radiation curing box 48 for at least partially curing a radiation-curable adhesive, a cutting station 50 for cutting an assembly comprising the radio frequency identification tag attached to the thermoformed part "TP" prepared at the thermoforming station 38, an insert molding station 52 for placing a radio frequency identification tag into the mold prior to introducing the desired polymeric materials into the mold, a conveyor belt 54 for delivering the cut assembly comprising the radio frequency identification tag and the thermoformed part "TP" into the mold, and a reel 56 for taking up the scrap material from the web. At various positions along the apparatus 30, pairs of pinch rollers 60, 62, are positioned as required to provide support for the web, e.g., adhesive coated composite film 34, during processing of the web. In addition, rollers 64, 66, 68 are positioned as required to change the orientation of the web, i.e., adhesive coated composite film 34, during processing of the web. In addition, a guiding and/or alignment system (not shown) can be employed to guide and/or align the web, e.g., adhesive coated composite film, during processing of the web. Further, additional rollers (not shown) can be employed to change the orientation of the web, i.e., adhesive coated composite film, during processing of the web. All of the foregoing components of the apparatus 30 are commercially available, and are well-known to one of ordinary skill in the art of molding containers from polymeric material.

The particular nature of the heating station 36 is not critical. Representative examples of heating stations suitable for use herein include, but are not limited to, heating stations that can employ halogen heating, infrared heating, catalytic heating, gas heating, or conductive heating. The particular nature of the thermoforming station 38 is not critical. Representative examples of thermoforming stations suitable for use herein include, but are not limited to, thermoforming stations that can employ vacuum forming, pressure forming, or drape forming. It should be noted that the thermoformed part becomes a component of the final container product. Referring again to FIG. 5, apparatus suitable for use as the thermoforming station 38 is known in the art and is described, for example, in *Encyclopedia of Polymer Science and Engineering*, Vol. 16, John Wiley & Sons, Inc. (1989), pages 807-832, incorporated herein by reference. The heating station 36 for softening the adhesive coated composite film 34 prior to a thermoforming step preferably comprises an infrared heater. The thermoforming processes preferred for use herein include vacuum forming, pressure forming, and drape forming. The function of the thermoforming station 38 is to form the thermoformed part "TP" in such a manner that it will conform to the desired shape of the finished product.

It is preferred that the radiation curing box 48 be capable of utilizing any source of ultraviolet radiation suitable for curing a radiation-curable adhesive. See, for example, *Radiation Curing: Science and Technology*, edited by S. Peter Pappas, Plenum Press (New York: 1992), pages 333-398, incorporated herein by reference. Ultraviolet radiation is preferred because of low capital costs and wide commercial availability. Representative examples of sources of ultraviolet radiation suitable for use herein include high intensity ultraviolet lamps, xenon lamps. Other types of radiation can also be used. Examples of types of radiation other than ultraviolet radiation include, but are not limited to, electron beam radiation. The radiation curing box 48 can be a commercially available ultraviolet radiation-curing station, such as, for example, is DYMAX 5000 UV Curing Flood Lamp System, DYMAX UV Light Curing Conveyor Systems, both of which are commercially available from Dymax Corporation, Torrington Conn. See DYMAX® Corporation Brochure LIT220, Mar. 19, 2007 and DYMAX® Corporation Brochure LIT012B, Mar. 8, 2007, both of which are incorporated herein by reference.

The cutting station 50 comprises an automated cutting apparatus to cut individual radio frequency identification tags from the web. The speed of the cutting mechanism of the cutting station 50 is synchronized with the speed of the molding process. The cutting station 50 can be a conventional die cutting station that can handle web processes. The shape of the die can be rectangular (including square), circular, ellipsoidal, or the like, depending upon the geometry of the mold and the finished product desired. Automated die cutting machines are well-known to those of ordinary skill in the art. Representative examples of die cutting machines suitable for use herein include flat-bed die cutting machines and rotary die-cutting machines. Die cutting machines suitable for use in the method described herein are commercially available form Brady Corporation, Milwaukee, Wis. Laser cutting machines can be used in the place of die cutting machines. Alternatively, the cutting operation can be a batch process, wherein the radio frequency identification tags are stored in a magazine rather than supplied in a roll, so as to be available for the molding operation.

The insert molding station 52 can employ such molding processes as injection molding, compression molding, transfer molding, reaction injection molding, extrusion blow molding, injection blow molding. Injection molding is described in *Encyclopedia of Polymer Science and Engineering*, Vol. 8, John Wiley & Sons, Inc. (1987), pages 102-138, incorporated herein by reference. Compression molding is described in *Encyclopedia of Polymer Science and Engineering*, Vol. 4, John Wiley & Sons, Inc. (1986), pages 79-108, incorporated herein by reference. Transfer molding is described in *Encyclopedia of Polymer Science and Engineering*, Vol. 4, John Wiley & Sons, Inc. (1986), pages 79-108, incorporated herein by reference. Reaction injection molding is described in *Encyclopedia of Polymer Science and Engineering*, Vol. 14, John Wiley & Sons, Inc. (1988), pages 72-100, incorporated herein by reference. Extrusion blow molding is described in *Encyclopedia of Polymer Science and Engineering*, Vol. 2, John Wiley & Sons, Inc. (1985), pages 447-478, incorporated herein by reference. Injection blow molding is described in *Encyclopedia of Polymer Science and Engineering*, Vol. 2, John Wiley & Sons, Inc. (1985), pages 447-478, incorporated herein by reference. The insertion step may require vacuum or electrostatic forces to stabilize the inserted thermoformed part "TP" bearing the radio frequency identification tag. The conveyor belt 54 is merely one means for transferring the die-cut assembly comprising the radio frequency identification tag and the thermoformed part "TP" into the mold. As an alternative to the conveyor belt 54, a robotic system can be use to transfer the aforementioned die-cut assembly into the mold.

Figure 6:
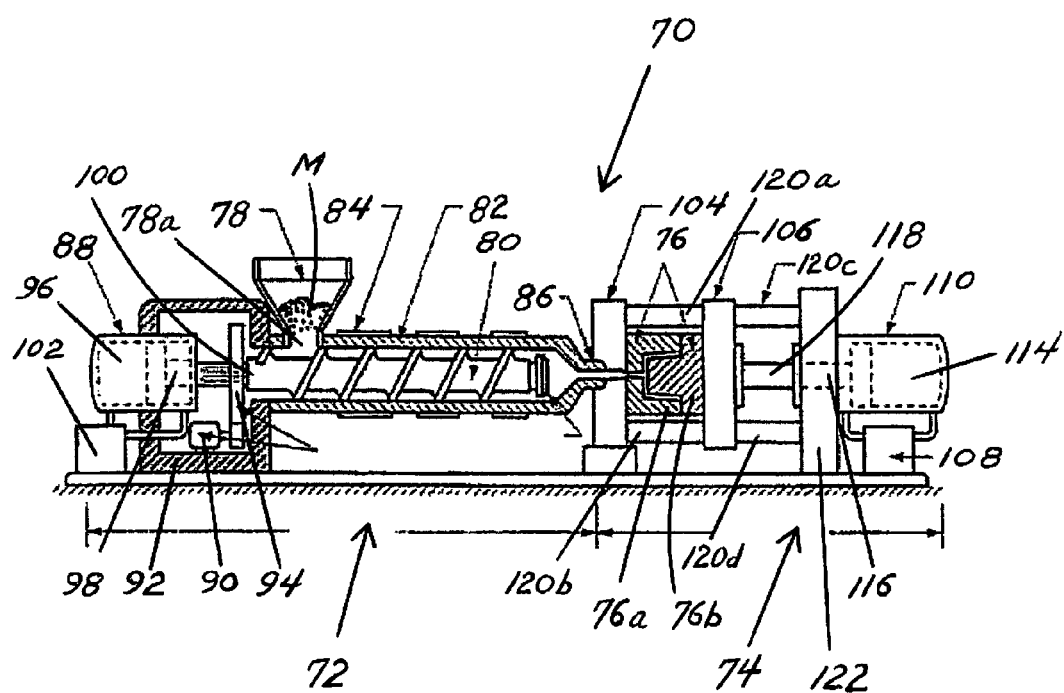
FIG. 6 is a schematic diagram illustrating an apparatus suitable for forming container bearing the radio frequency identification tag shown in FIGS. 2, 3, and 4 by means of insert injection molding.

FIG. 6 illustrates a molding machine that can be adapted for use in an insert molding process that can be carried out in the insert molding station 52. An injection-molding machine 70 comprises two basic parts, an injection unit 72 and a clamping unit 74. Different injection molding machines differ in both injection unit and clamping unit. The name of the injection-molding machine is generally based on the type of injection unit used. The following description is adapted from Injection Molding Machine, [online], [retrieved on 2007-12-13] Retrieved from the Internet: <URL: http://plastics.inwiki.org/Injection_molding_machine>, incorporated herein by reference.

The injection unit 72 melts the polymer or resin and injects the polymeric or resinous melt into the mold 76. The mold 76 comprises a first mold half 76a and a second mold half 76b. The mold 76 can be ram fed or screw fed. An injection ram is a ram or screw that applies pressure on the molten polymeric or resinous material to force the molten material into the cavities of the mold halves 76a, 76b of the mold 76. The reciprocating screw is the most common type of injection ram. The design described herein uses the same barrel for melting and injection of polymer or resin. A feed hopper 78 is a container that holds a supply of molding material "M" to be fed to a reciprocating screw 80. The feed hopper 78 is located over a barrel 82 and a feed throat 78a connects the feed hopper 78 and the barrel 82. An alternative unit (not shown) involves the use of separate barrels for plasticizing and injecting the polymer or resin. This alternative unit is called a screw-preplasticizer machine or two-stage machine. In this alternative unit, polymeric or resinous pellets are fed from the feed hopper into a barrel in a first stage, which uses a screw to drive the polymer or resin forward and melt the polymer or resin. This barrel in the first stage feeds a barrel in a second stage, which latter barrel uses a plunger to inject the molten polymer or resin into the mold. Older machines used one plunger-driven barrel to melt and inject the polymer or resin. These older machines are referred to as plunger-type injection molding machines. The barrel 82 is a major part that melts polymers or resins transmitted from the feed hopper 78 though screws and is structured in a way that can heat polymers or resins to the proper temperature. A band heater 84, which can control temperature in five sections, is attached outside the barrel 82. Melted polymers or resins are supplied to the mold 76 by passing through the barrel head, shut-off nozzle, and one-touch nozzle 86. A hydraulic motor 90 located inside a bearing box 92 rotates the screw 80, by means of gears 94, and the melted polymers or resins are measured at the nose of the screw 80. There are many types of injection cylinders that supply necessary power to inject polymers or resins, according to the characteristics of the polymers or resins and types of products, at the appropriate, speed and pressure. The model shown in FIG. 6 employs the double cylinder type. The injection cylinder 88 comprises a cylinder body 96, a piston 98, and a piston load 100. The injection cylinder 88 is actuated through the aid of a pneumatic or hydraulic energy source 102.

The clamping unit 74 holds the mold halves 76a, 76b of the mold 76 together, opens and closes the mold halves 76a, 76b of the mold 76 automatically, and ejects the finished part from the mold 76. The mechanism of the clamping unit 74 can be of several designs, such as, for example, mechanical, hydraulic, or hydromechanical. There are two main types of injection molds: cold runner (two plate and three plate designs) and hot runner—the more common of the runnerless molds. Injection platens 104, 106 are steel plates on a molding machine to which the mold halves 76a, 76b of the mold 76 are attached. Generally, two platens 104, 106 are used, one platen 104 being stationary and the other platen 106 being movable, actuatable hydraulically by a hydraulic cylinder 108 to open and close the mold 76. The platens 104, 106 provide the positions to mount the mold halves 76a, 76b of the mold 76. The platens 104, 106 contain threaded holes (not shown) on which the mold halves 76a, 76b of the mold 76 can be mounted by using clamps (not shown). A clamping cylinder 110 is a device that effects clamping through the aid of a pneumatic or hydraulic energy source 112. The clamping cylinder 110 has a cylindrical body 114, a piston 116, and a piston load 118. Two tie rods 120a, 120b are located between the stationary platen 104 and the movable platen 106. Two tie rods 120c, 120d are located between the movable platen 106 and the support 122 for the clamping cylinder 110.

The purpose of the conveyor belt 54 is to transfer the cut assembly comprising an individual radio frequency identification tag to the mold cavity of the insert molding station 52. An alignment system (not shown) can be used to introduce the cut assembly comprising an individual radio frequency identification tag into the proper location in the insert molding station 52.

Figure 8:
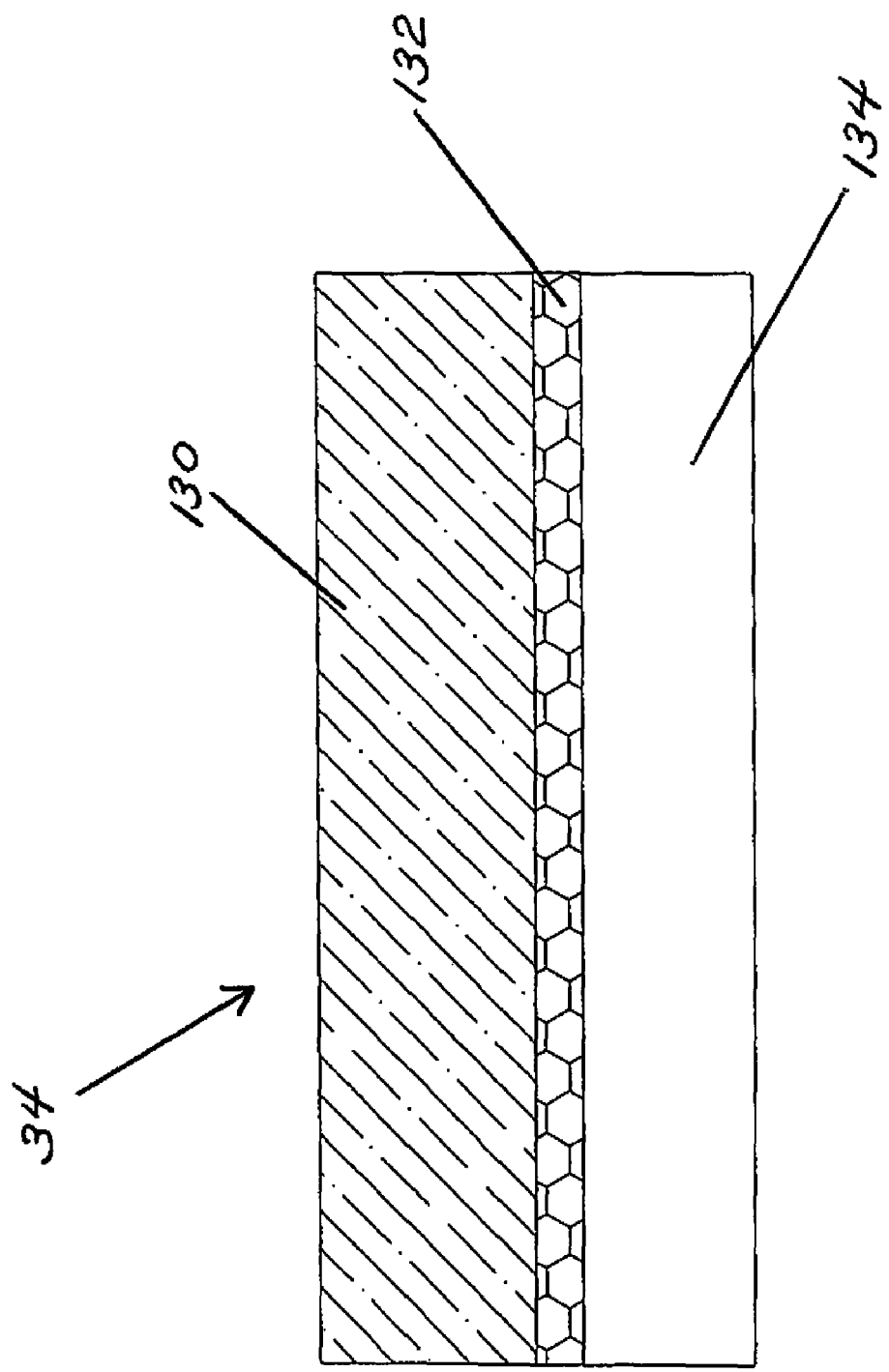
FIG. 8 is a schematic diagram showing a side view in elevation of the layers of the adhesive coated composite film, the adhesive layer of which is capable of bearing a radio frequency identification tag.

Referring now to FIG. 8, the roll of adhesive coated composite film 34 comprises a polymeric backing 130 having two major surfaces. On one major surface of the polymeric backing 130 is a layer of radiation-curable adhesive 132 having two major surfaces. A layer of release liner 134 overlies one major surface of the layer of radiation-curable adhesive 132. Accordingly, the layer of radiation-curable adhesive 132 is positioned between one major surface of the polymeric backing 130 and one major surface of the layer of release liner 134, whereby one major surface of the layer of radiation-curable adhesive 132 is in contact with one major surface of the polymeric backing 130 and the other major surface of the layer of radiation-curable adhesive is in contact with one major surface of the layer of release liner 134. The function of the release liner 134 is to prevent blocking when the adhesive coated composite film 34 is in the form of a roll. The adhesive coated composite film 34 can be produced by one of ordinary skill in the art, with care being taken to select the appropriate radiation-curable adhesive and the appropriate material for the polymeric backing.

Materials that are suitable for the polymeric backing 130 bearing a layer of radiation-curable adhesive 132 include, but are not limited to, high density polyethylene, ultra high molecular weight polyethylene, polypropylene, polystyrene, polyvinyl chloride, polyethylene terephthalate, glycol modified polyethylene terephthalate, acid modified polyethylene terephthalate, polybutylene terephthalate, polycarbonate, polyamides, such as, for example, Nylon 6 and Nylon 6,6, polyvinylidene fluoride, and co-extruded or laminated films comprising two or more of the aforementioned polymeric materials. The thickness of the polymeric backing typically ranges from about 0.05 mm to about 0.20 mm, preferably from about 0.10 mm to about 0.15 mm. Polypropylene is commercially available from Exxon Mobil Corporation under the product designation ExxonMobil PP9852E1 or from Basell Polyolefins under the product designation Profax HL783H. Polyethylene terephthalate is commercially available from DuPont Teijin Films under the trade designation Mylar® 814 and Mylar® M813. Polystyrene is commercially available from The Dow Chemical Company under the trade designation Trycite™ films. Nylon is commercially available from Honeywell International Inc. under the trade designation Honeywell Capran® 526. Polycarbonate is commercially available from Bayer Material Science LLC under the trade designation Makrofol® DE 1-1. Polychlorotrifluoroethylene, a suitable alternative for the foregoing polymers, is commercially available from Honeywell International Inc. under the trade designation Aclar®. The polymeric backing must be transparent to ultraviolet radiation so that sufficient radiant energy can reach the layer of adhesive to at least partially cure the layer of adhesive. Resistance to high temperature is not critical because the polymeric backing contacts mold walls during molding processes and the temperature of the mold walls is typically less than 60° C.

The radiation-curable adhesive 132 is preferably an ultraviolet radiation-curable adhesive, such as, for example, an ultraviolet radiation-curable acrylate adhesive or an ultraviolet radiation-curable epoxy adhesive. The viscosity of the ultraviolet radiation-curable adhesive can range from about 10,000 to about 100,000 cp, preferably from about 20,000 to about 50,000 cp. These ranges are selected to prevent the adhesive from oozing out of rolls of adhesive coated composite film 34. Alternatively, the radiation-curable adhesive can be a dual cure system, which uses heat and ultraviolet radiation for curing. Commercially available radiation-curable adhesives suitable for use in this invention include, but are not limited to, Master Bond UV10TK or Master Bond UV21, commercially available from Master Bond Inc., Hackensack, N.J., DYMAX 1191-M medical plastic adhesive or DYMAX 3069 plastic bonding adhesive, commercially available from Dymax Corporation, Torrington Conn. Commercially available dual cure radiation-curable adhesives suitable for use in this invention include, but are not limited to, Master Bond UV15-7DC (Dual Cure), commercially available from Master Bond Inc., Hackensack, N.J. The coating thickness of the ultraviolet radiation-curable adhesive can range from about 10 g/m² to about 60 g/m².

Materials that are suitable for the release liner 134 for the adhesive coated composite film 34 for the method described herein include silicone, typically applied as a coating to any of the following liner materials: Kraft paper, clay processed paper, thermoplastic polyester (such as, for example, polyethylene terephthalate), polystyrene, polyvinyl chloride, low density polyethylene, linear low density polyethylene, high density polyethylene, polypropylene. The liners can also be made with coextruded or laminated films comprising two or more of the aforementioned liner materials. The aforementioned liner materials in an embossed form are also suitable for preparing release liners suitable for use herein. The preferred material for the process described herein is silicone coated Kraft paper, on account of its low cost.

The thickness of the release liner made of a thermoplastic film can range from about 0.01 mm to about 0.15 mm, and preferably ranges from about 0.07 mm to about 0.12 mm. The thickness of the release liner made of a paper can range from about 50 lb to about 120 lb base weight; preferably from about 60 to about 90 lb base weight. Commercially available release liner suitable for use with the process described herein is 70 lb polymer-coated Kraft release paper, available from Adhesives Research, Inc., Glen Rock, Pa. or 3M™ 83 lb paper medical release liner 1361, available from 3M, St. Paul, Minn.

Figure 7:
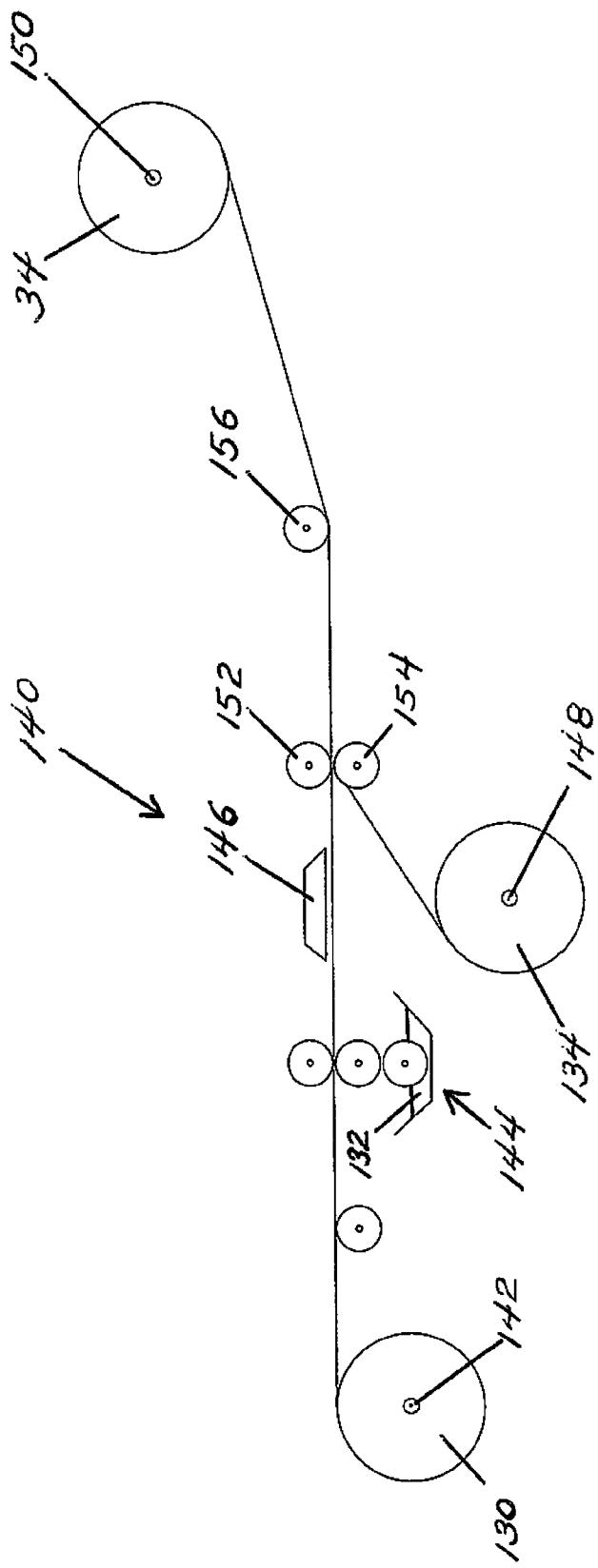
FIG. 7 is a schematic diagram illustrating an apparatus suitable for preparing an adhesive coated composite film, the adhesive layer of which is capable of bearing a radio frequency identification tag.

FIG. 7 illustrates an apparatus suitable for preparing a roll of adhesive coated composite film 34. The apparatus 140 comprises a reel 142 for holding a roll of polymeric backing 130, a coating station 144 for coating a layer of radiation-curable adhesive 132 onto one major surface of the of the polymeric backing 130, a heating station 146 for partially curing the layer of radiation-curable adhesive 132, a reel 148 for holding a roll of release liner 134, and a take-up reel 150 for taking up a roll of adhesive coated composite film 34. A pair of pinch rollers 152, 154 can be used to laminate a layer of release liner 134 to the assembly comprising the layer of polymeric backing 130 and the layer of radiation-curable adhesive 132. Another roller 156 can be used to guide the adhesive coated composite film 34 to the take-up reel 150.

In order to prepare a roll of adhesive coated composite film 34, a layer of radiation-curable adhesive 132 is coated onto one major surface of a polymeric backing 130 to form a two layer composite film. The layer of radiation-curable adhesive 132 can be applied to the major surface of the polymeric backing by means of a transfer roll coating process. Transfer roll coating processes are described in ABOUT ROLL COATERS, [online], [retrieved on Dec. 13, 2007] Retrieved from the Internet: <URL: http://www.schaeferco.com/about_rollcoaters.html>, incorporated herein by reference. It is preferred that the radiation-curable adhesive be capable of being cured by ultraviolet radiation. Ultraviolet radiation-curable adhesives can have a dual action curing system or can be a high viscosity ultraviolet radiation-curable adhesive. The ultraviolet radiation-curable adhesive can be partially cured by heat, typically by means of an infrared heater, and later completely cured by ultraviolet radiation.

A layer of release liner 134 is applied over one major surface of the layer of radiation-curable adhesive 132 to protect the layer of radiation-curable adhesive 132 from damage and blocking (i.e., sticking). As shown in FIG. 8, the adhesive coated composite film 34 is a three layer construction comprising a polymeric backing 130, a layer of radiation-curable adhesive 132, and a layer of release liner 134. The adhesive coated composite film 34 can be transferred to the next processing area, i.e., the processing area shown in FIG. 5 or can be linked to the next processing area to form a continuous operation.

The radio frequency identification tag is applied to the thermoformed part "TP" at the station 46 for transferring radio frequency identification tags to the thermoformed part "TP". The station 46 comprises a roll 44 of radio frequency identification tags 164 adhered to a layer of protective film 166 and a pair of pinch rollers 168, 170 for laminating the assembly of radio frequency identification tags 164 and the layer of protective film 166 to the layer of radiation-curable adhesive 132 on the thermoformed part "TP".

Materials that are suitable for the layer of protective film 166 for the radio frequency identification tags include, but are not limited to, polyimide, liquid crystal polymer (LCP), polyphenyl sulfide (PPS). Commercially available materials suitable for use as the protective base film for the radio frequency identification tags include Kapton® PST polyimide (thickness of 13 or 25 μm), commercially available from E. I. duPont de Nemours and Company, Vectra® A-950 liquid crystal polymer (thickness of 50 μm), commercially available from Rogers Corporation, Rogers Conn., Torelina® polyphenyl sulfide film (thickness of 12 or 25 μm), commercially available from Toray Resin Company, Troy Mich. It is preferred that the protective film for the radio frequency identification tags be resistant to temperatures of up to 250° C.

Radio frequency identification tags suitable for use herein a commercially available from Avery Dennison Corporation, Pasadena, Calif. Product identification numbers include AD-811 and AD-812 RFID Inlays. These radio frequency identification tags are passive radio frequency identification tags. The size is approximately 1 inch×1 inch. The parameters of these radio frequency identification tags are as follows:

AD-811 (Optimized frequency range ETSI (865-868 MHz))

AD 812 (Optimized frequency range FCC (902-928 MHz))

Protocol: ISO/IEC 18000-6C and EPC Class 1 Gen 2

The shape of the radio frequency identification tag is not critical, but it is preferred that the assembly comprising the radio frequency identification tag and the adhesive coated composite film (less the release liner) be easy to cut by means of the cutting machine. Accordingly, it is preferred that the radio frequency identification tag be rectangular, including square, circular, elliptical.

The molding operation can be a conventional molding operation, such as, for example, extrusion blow molding, injection blow molding, injection molding, reaction injection molding, compression molding, transfer molding. The processes are described in *Encyclopedia of Polymer Science and Engineering*, Vol. 8, John Wiley & Sons, Inc. (1987), pages 102-138; *Encyclopedia of Polymer Science and Engineering*, Vol. 4, John Wiley & Sons, Inc. (1986), pages 79-108; *Encyclopedia of Polymer Science and Engineering*, Vol. 4, John Wiley & Sons, Inc. (1986), pages 79-108; *Encyclopedia of Polymer Science and Engineering*, Vol. 14, John Wiley & Sons, Inc. (1988), pages 72-100; *Encyclopedia of Polymer Science and Engineering*, Vol. 2, John Wiley & Sons, Inc. (1985), pages 447-478, all of which have been previously incorporated herein by reference. Suitable processes are also described in U.S. Pat. Nos. 4,643,789 and 4,369,157, incorporated herein by reference. In the molding process, the adhesive coated composite film (less the release liner) bearing the radio frequency identification tag is fused to the object generated by the insert molding station 52. The radio frequency identification tag can be introduced to the mold by means of vacuum or by electrostatic forces to maintain the radio frequency identification tag stationary during the molding process.

It is preferred that soft rubber rollers (e.g., hardness ranging from about 50 to about 100 Shore A, preferably from about 50 to about 60 Shore A for delicate materials) be used at the station 46 for transferring radio frequency identification tags to the thermoformed part to ensure good contact of the radio frequency identification tag to the radiation-curable adhesive.

Materials that are suitable for preparing the molded article, e.g., containers, include, but are not limited to, thermoplastic materials, such as, for example, low density polyethylene, ultra low density polyethylene, linear low density polyethylene, high density polyethylene, ultra high molecular weight polyethylene, polystyrene, high impact polystyrene, polypropylene, polymethyl methacrylate, acrylonitrile-butadiene-styrene copolymer, styrene acrylonitrile copolymer; thermosetting materials, such as, for example, polyurethanes, epoxy resins, polyesters, silicones.

Operation

Referring now to FIG. 5, the adhesive coated composite film 34 is pre-heated to soften the adhesive coated composite film 34 at the heating station 36 before the adhesive coated composite film 34 enters the thermoforming station 38. After the adhesive coated composite coated film is pre-heated, the adhesive coated composite film 34 undergoes a thermoforming operation. When the adhesive coated composite film 34 enters the thermoforming station 38, the thermoforming operation can be carried out by vacuum thermoforming, pressure thermoforming (positive displacement), or a combination of the foregoing. After the thermoforming process has been carried out, the release liner 134 is taken up by the take-up reel 40. The release liner 134 is then removed to expose the layer of ultraviolet radiation-curable adhesive before the radio frequency identification label (tag) is applied to the layer of ultraviolet radiation-curable adhesive.

The roll containing the radio frequency identification tags is provided separately from the roll of adhesive composite coated film, or the roll containing the radio frequency identification labels can be obtained commercially from a supplier, such as, for example, Avery Dennison Corporation, Pasadena Calif., or Owens-Illinois Inc., Perrysburg, Ohio. The protective film 166 for the radio frequency identification tags is required to serve as a heat shield for the radio frequency identification tags during the molding process.

The radio frequency identification tag 164 and the protective film 166 are applied to the polymeric backing 130 bearing the layer of radiation-curable adhesive 132 and the resultant film structure comprises four layers, namely the polymeric backing 130, an radiation-curable adhesive 132, the radio frequency identification tag 164, and the protective film 166. It should be noted that the radio frequency identification tag 164 is eventually embedded into the partially cured layer of ultraviolet radiation-curable adhesive.

The station 46 for transferring radio frequency identification tags to the thermoformed part "TP" has two soft rubber rollers (hardness of from about 50 to about 100 Shore A) to ensure adequate contact between the radio frequency identification tag 164 and the layer of radiation-curable adhesive 132 and to prevent damaging the radio frequency identification tag 164.

The four-layer structure traverses the radiation curing box 48 to cure the radiation-curable adhesive completely. The radiation curing process is typically performed within a period of a few seconds, especially if the layer of radiation-curable adhesive is thin.

Figure 9A:
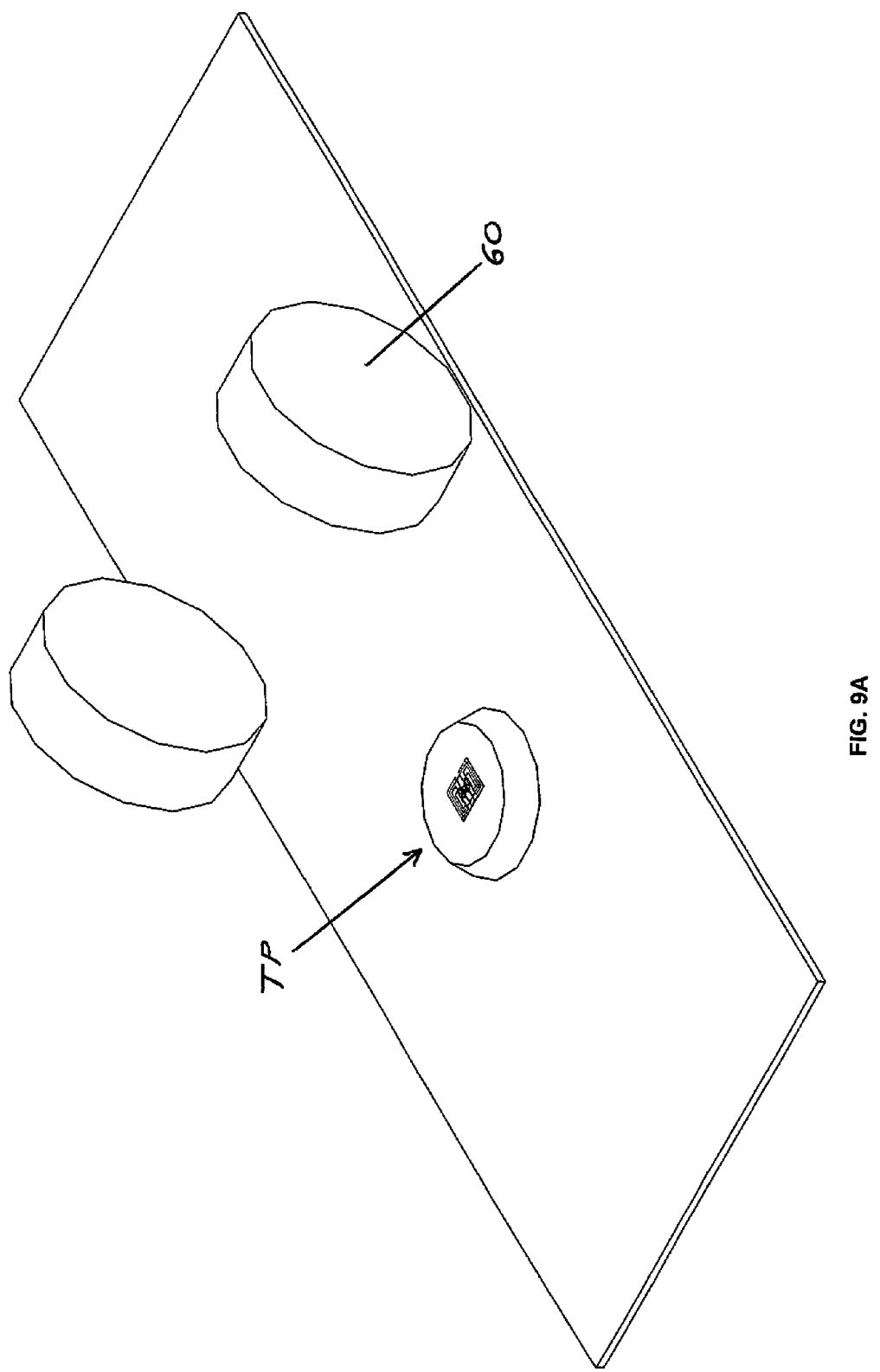
FIG. 9A is a schematic diagram, in perspective, illustrating the web immediately prior to entering the cutting station.
Figure 9B:
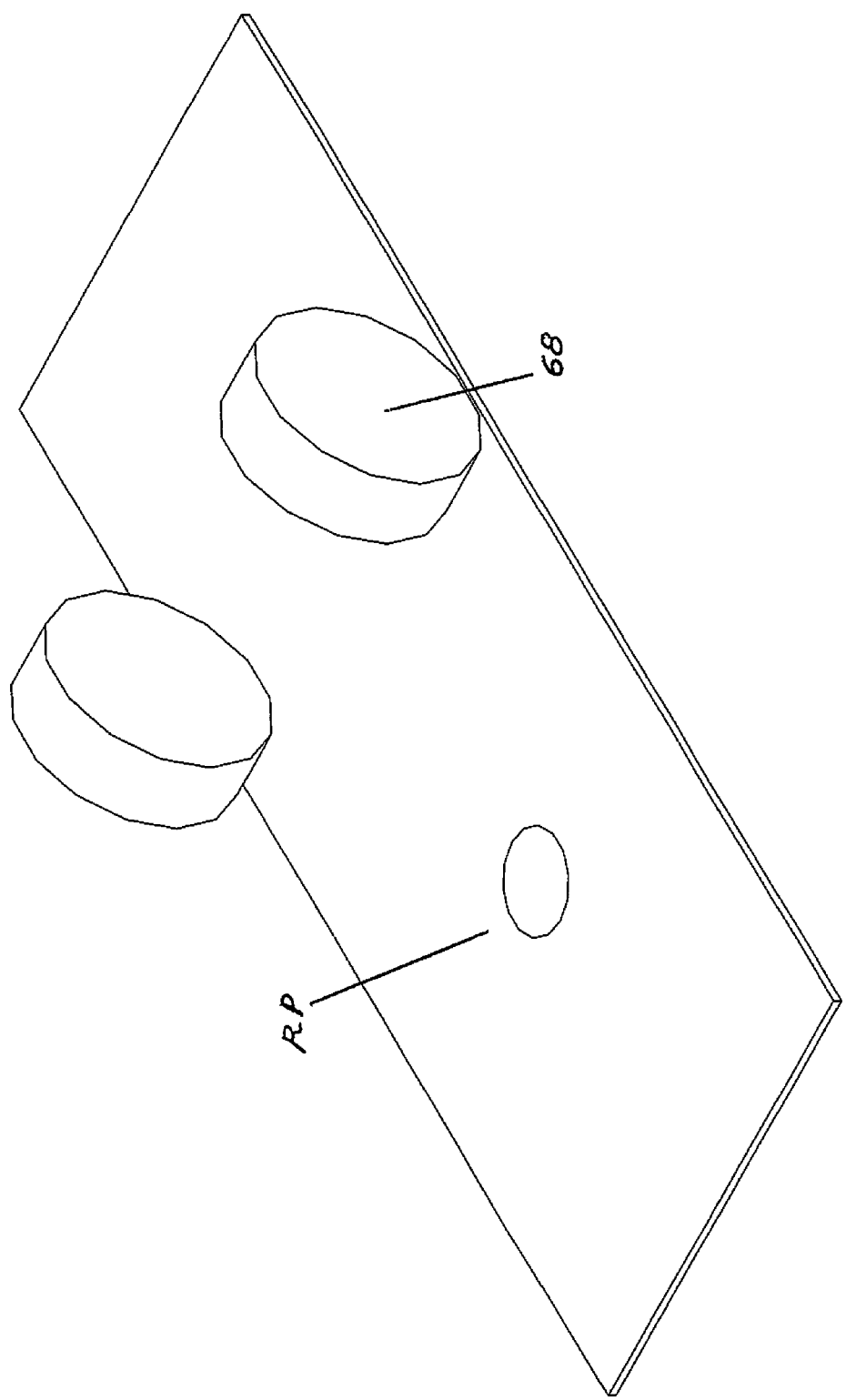
FIG. 9B is a schematic diagram, in perspective, illustrating the web immediately after leaving the cutting station.
Figure 10:
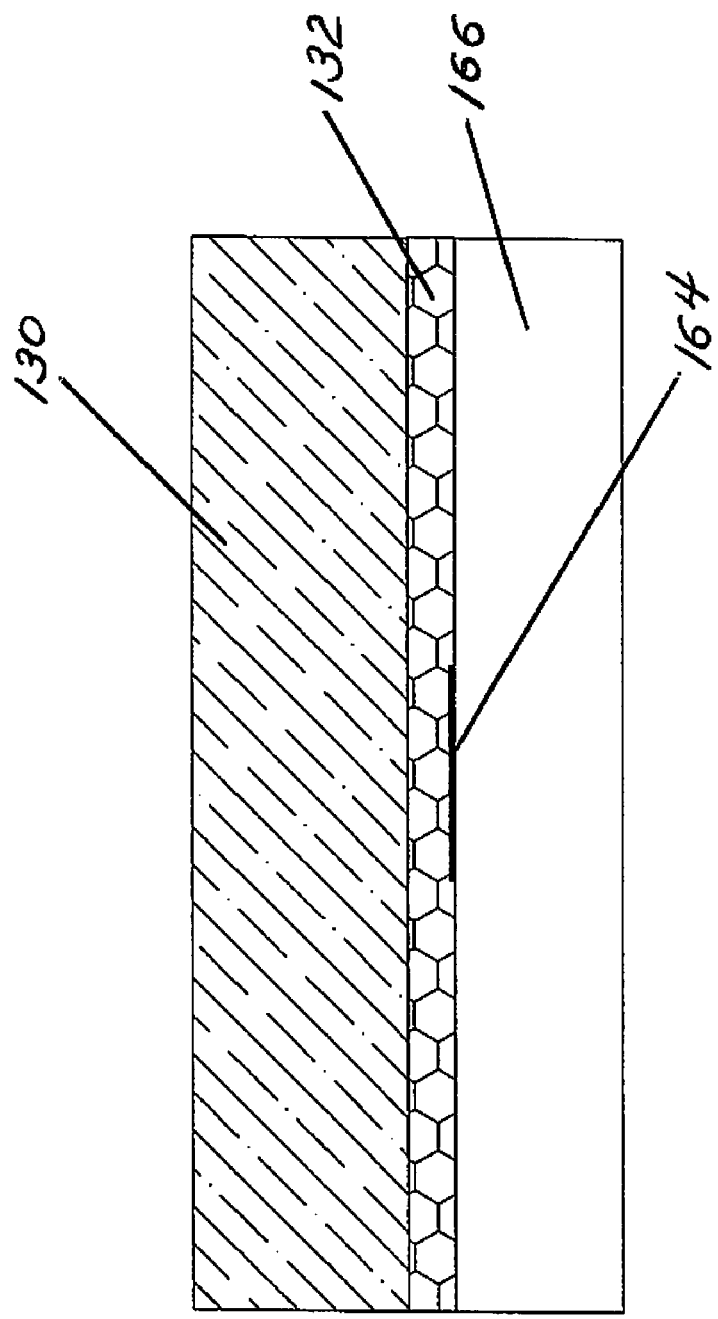
FIG. 10 is a schematic diagram showing a side view in elevation of the layers of the adhesive coated composite film, the adhesive layer of which is capable of bearing a radio frequency identification tag. In this figure, the release liner is removed, but a radio frequency identification tag and a protective film are added.

At the cutting station 50, the portion of the web that is to be used for the insert molding operation is cut from the web by means of a cutting apparatus, typically a die cutting machine or a laser cutting machine. FIG. 9A shows the web immediately prior to entering the cutting station 50. FIG. 9B shows the web immediately after leaving the cutting station 50. The cut assembly comprising the polymeric backing 130, the radio frequency identification tag 164, and the protective film 166 is loosely attached to the web, i.e., the residual portion "RP" of the adhesive coated composite film 34, which is unusable. Therefore, it is preferred that the cut assembly comprising the polymeric backing 130, the radio frequency identification tag 164, and the protective film 166 be introduced into the insert molding station 52 by means of a conveyor belt 54. A robotic system can be used in place of the conveyor belt 54. The web scrape is collected prior to the molding step as a scrape roll. The web scrape is the residual portion "RP" of the adhesive coated composite film 34 that is unusable. On account of the cured radiation-curable adhesive, the unusable residual portion of the adhesive coated composite film 34 that emerges from the cutting station 50 cannot easily be recycled. Depending upon the type of molding machine utilized in the insert molding station 52, conditions of the insert molding process will vary. For example, polyethylene can be injection molded at temperatures ranging from about 350° F. to 500° F. The critical aspect of the conditions of the molding step is the protective film 166 for the radio frequency identification tag 164. This protective film 166 must be capable of resisting the temperature of the molding step. FIG. 10 shows the layers of the adhesive coated composite film 34, the adhesive layer of which is bearing a radio frequency identification tag 164. In this figure, the release liner is removed, but a radio frequency identification tag 164 and a protective film 166 are present. The pressure encountered during the molding step also depends upon the nature of the polymeric material used to form the container and the design of both the container and the molding machine. Typical pressure expected to be encountered during the molding step range from about 5,000 psi to about 15,000 psi. The speed of the web is required to be synchronized with the molding cycle. At the conclusion of the molding step, the finished article is released from the mold, by opening the halves 76a, 76b of the mold 76. The finished article is either transferred for further processing or stored to await further processing.

The method described herein provides numerous benefits and advantages relative to the prior art. Benefits of applying a radio frequency identification tag to a container by the method of this invention, i.e., a web process incorporating insert molding, include, but are not limited to, reduction of cost, reduction of the risk of counterfeiting of the radio frequency identification tag, and improvement in appearance of the radio frequency identification tag. In particular, the likelihood of delamination of the radio frequency identification tag is reduced because the assembly comprising the microchip and the antenna is protected by the polymeric material used for preparing the container itself. A conventional radio frequency identification tag tends to be damaged and is subject to tampering. The method described herein makes it possible to consolidate the steps of forming a container by means of a molding process and applying a radio frequency identification tag to the container during the molding process, thereby eliminating the step of applying a radio frequency identification tag to a container after the container is formed, by molding or by other means.

The method described herein can also be used to apply radio frequency identification tags to micro-well plates. The radio frequency identification tag would be expected to be positioned at one corner of a micro-well plate having 96 or more micro-wells. As used herein, the expression "micro-well plate", also called "microtiter plate", "microplate", means a flat plate having a plurality of "wells" used as small test tubes.

All of the materials needed for preparing adhesive coated composite film 34, the radio frequency identification tags 10, 164, the protective film 166, and the container 16 are commercially available and are well-known to those of ordinary skill in the art. All of the equipment needed for preparing insert molded radio frequency identification tag bearing container 16 are commercially available and are well-known to those of ordinary skill in the art.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for attaching a RFID tag to a container for use in an automated diagnostic analyzer, the process comprises the steps of:
   (a) providing a roll of adhesive coated composite film, the adhesive coated composite film comprising a polymeric backing, a layer of release liner, and a layer of radiation-curable adhesive between the polymeric backing and the layer of release liner, one major surface of the layer of radiation-curable adhesive being in face-to-face contact with one major surface of the polymeric backing and the other major surface of the layer of radiation-curable adhesive being in face-to-face contact with one major surface of the release liner;
   (b) forming a part from the adhesive coated composite film for bearing a radio frequency identification tag, the part formed by means or thermoforming;
   (c) removing the layer of release liner from the thermoformed part;
   (d) providing a roll comprising a plurality of radio frequency identification tags, the radio frequency identification tags in face-to-face contact with a layer of protective film;
   (e) at least partially embedding the radio frequency identification tags in the radiation-curable adhesive of the thermoformed part;
   (f) fixing the radio frequency identification tag by means of a radiation curing process to form an assembly comprising a layer of polymeric backing, radio frequency identification tags, and a layer of protective film;
   (g) cutting the assembly in step (f) by means of a cutting apparatus to form an assembly comprising a polymeric backing, a single radio frequency identification tag, and a layer of protective film;
   (h) molding an article in a mold and attaching the radio frequency identification tag to the molded container in the mold; and
   (i) releasing the molded article to which the radio frequency identification tag is attached from the mold.

2. The method of claim 1, wherein the article is a container.

3. The method of claim 2, wherein the container is a micro-well plate.

4. The method of claim 1, wherein the molding step utilizes insert molding.

5. The method of claim 1, wherein the molding step utilizes injection molding.

6. The method of claim 1, wherein the adhesive coated composite film is heated prior to undergoing step (b).

7. The method of claim 1, wherein the radio frequency identification tags are provided in the form of a roll.

8. The method of claim 1, wherein the radiation-curable adhesive is curable by ultraviolet radiation.

9. The method of claim 1 wherein the adhesive coated composite film is prepared by a method comprising the steps of:

(a) providing a polymeric backing;

(b) coating a layer of radiation-curable adhesive onto one major surface of the polymeric backing to form a two layer composite film; and (c) applying a layer of release liner over one major surface of the layer of radiation-curable adhesive.

10. The method of claim 9, wherein the layer of radiation-curable adhesive is coated onto one major surface of the polymeric backing to form a two layer composite film by means of transfer roll coating.

11. The method of claim 1, wherein the assembly comprising a layer of polymeric backing, a radio frequency identification tag, and a layer of protective film is transferred from the cutting station to the mold by means of a conveyor belt.

12. The method of claim 1, wherein the assembly comprising a layer of polymeric backing, a radio frequency identification tag, and a layer of protective film is transferred from the cutting station to the mold by means of a robotic mechanism.

* * * * *